Inventors
Kenneth W. Johnson
Thomas E. Klippert
Warren J. Ramler
By:
Attorney

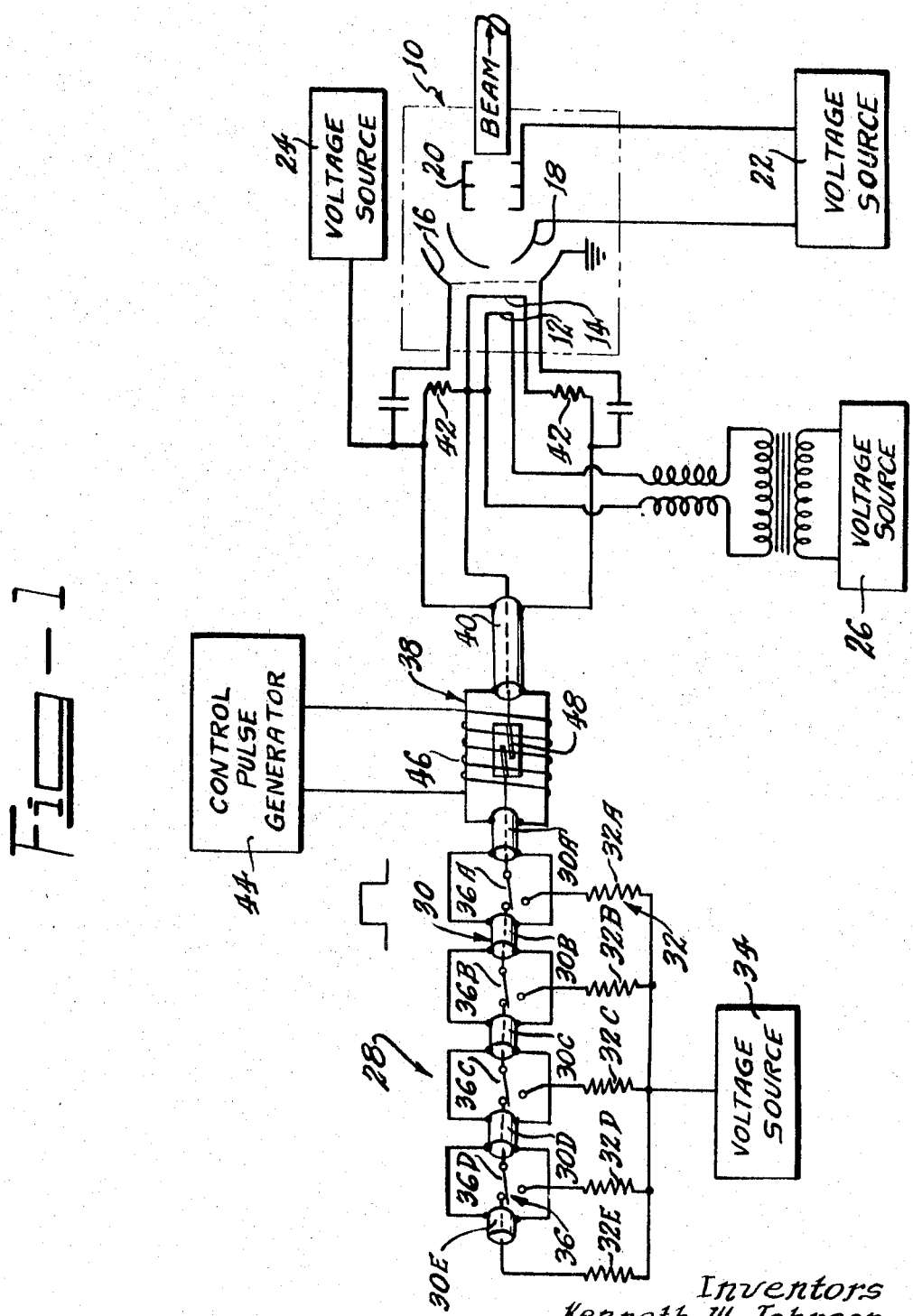

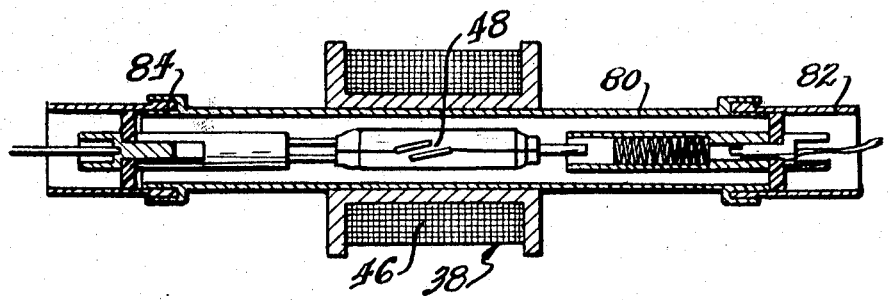
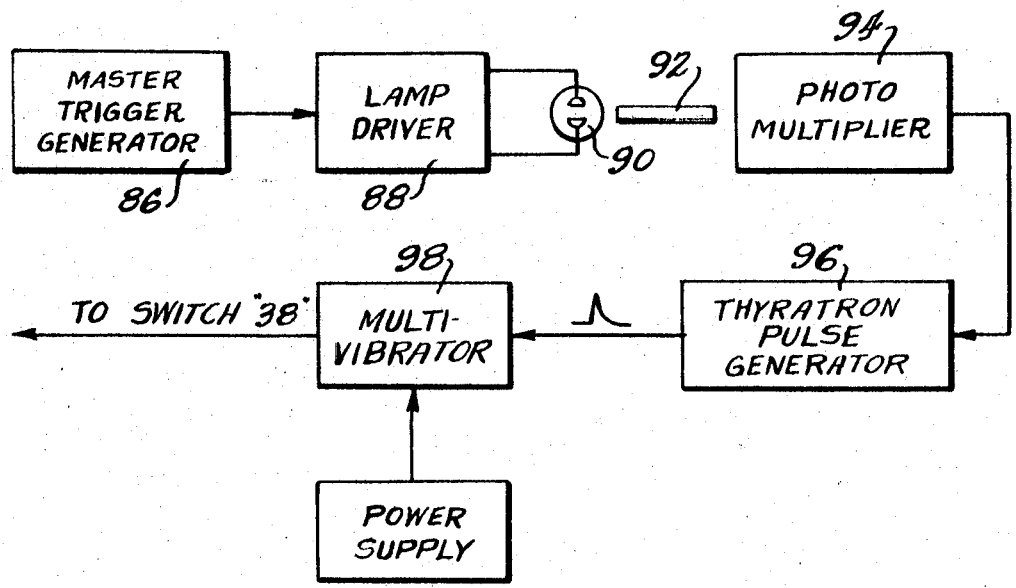

United States Patent Office 3,457,517
Patented July 22, 1969

3,457,517
ELECTRON PULSE GENERATOR OF THE GROUNDED GRID TYPE EMPLOYING A DELAY LINE STORAGE MEANS
Kenneth W. Johnson, Lockport, Thomas Edward Klippert, Lombard, and Warren J. Ramler, Elmhurst, Ill., assignors to the United States of America as represented by the Secretary of the United States Atomic Energy Commission
Filed June 9, 1967, Ser. No. 645,582
Int. Cl. H01j 29/98
U.S. Cl. 328—231       8 Claims

ABSTRACT OF THE DISCLOSURE

A high-current pulsed electron source including a grounded grid electron gun. A coaxial delay line charged from a voltage source is connected to the cathode of the electron gun via a coaxial mercury-wetted contact switch to provide a nanosecond duration driving pulse therefor. The components of the system are matched in characteristic impedance.

Contractual origin of the invention

The invention described herein was made in the course of, or under, a contract with the United States Atomic Energy Commission.

Background of the invention

In general, the present invention relates to an electron source, and more particularly to electron sources capable of producing high-current pulses of nanosecond duration.

Electron sources are utilized in electron accelerators, such as a Van de Graaff electron accelerator, to produce a pulsed electron beam. In the Van de Graaff accelerator, the conventional electron source produces a peak beam pulse of approximately 1 ampere for time durations of 1, 3 and 5 microseconds. However, for some investigations, it is desirable that a high-current electron beam of nanosecond duration be generated, for example in the investigation of the formation time of the hydrated electron. Present electron sources are not capable of this type of operation.

Accordingly, it is an object of the present invention to provide an electron source which is capable of generating a current pulse of nanosecond duration.

It is another object of the present invention to provide an electron source capable of producing high-current pulses of nanosecond duration.

Other objects of the present invention will become more apparent as the detailed description proceeds.

Summary of the invention

In general, the present invention comprises an electron gun including an anode, a cathode and a grid. Means are provided to electrically bias the anode and grid of the electron gun. A coaxial cable is charged to a predetermined voltage and coaxial switching means transfer the charge on the coaxial cable to the cathode of the electron gun.

Brief description of the drawings

Further understanding of the present invention may best be obtained from consideration of the accompanying drawings wherein:

FIG. 1 is a schematic drawing of the preferred embodiment of an apparatus constructed according to the present invention.

FIG. 2 is a cross-sectional view of the mercury switch of the apparatus of FIG. 1.

FIG. 3 is a block diagram of the control pulse generator of the apparatus of FIG. 1.

Description of the preferred embodiment

Figure 4:
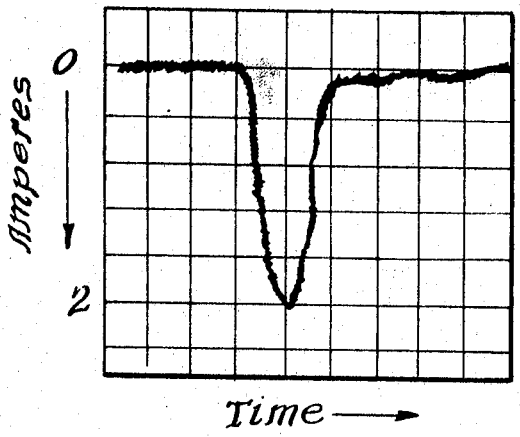
FIG. 4 is a graphical display of a typical beam current pulse obtained using the apparatus of FIG. 2.

The electron source of the present invention utilizes a grounded-grid electron gun 10. The electron gun 10 comprises a heater 12, a cathode 14, a grid 16, an anode 18 and focusing electrodes 20. The anode and focusing electrodes 18 and 20 are connected to a high-voltage positive supply 22. The grid 16 is electrically grounded and the generation of a pulsed electron beam from cathode 14 is effected by the application thereto of a negative pulse. To minimize or inhibit interpulse electron emission, a positive bias is applied to the cathode 14 from a voltage supply 24. The heater 12 for the cathode 14 is connected to and driven by a voltage supply 26.

The voltage pulses applied to the cathode 14 of electron gun 10 are generated by a pulse-forming network 28. The pulse-forming network 28 comprises a plurality of coaxial delay lines 30 which, together with resistors 32, form a charging system which is charged from a negative polarity voltage supply 34. The coaxial delay lines 30 are interconnected of each other and resistors 32 via coaxial switches 36. A mercury-wetted contact switch 38 connects the delay lines 30 to the cathode 14 of the electron gun 10 via a coaxial delay line 40, whereby a pulse is generated and applied to the cathode 14. The coaxial delay line 40 is terminated at the cathode 14 of electron gun 10 in its characteristic impedance by parallel connected resistors 42. A control pulse generator 44 drives the actuating coil 46 of the mercury-wetted contact switch 38 to effect the pulse generation and transmission.

In operation, the delay lines 30 connected in a predetermined manner with respect to resistors 32 to generate a desired pulse length, as hereinafter will be appreciated, are nefiatively charged from the voltage supply 34. The output from control pulse generator 44 actuates the coil 46 of mercury-wetted contact switch 38 to cause closure of the contacts 48 thereof, whereby the voltage stored in the coaxial delay lines 30 is discharged via the coaxial delay line 40 to the cathode 14 of electron gun 10. With the anode 18 and focusing grids 20 of the electron gun 10 maintained at a high positive voltage and the grid 16 thereof electrically grounded, the negative pulse transmitted by the pulse-forming network 28 causes emission of a pulsed electron beam from the cathode 14. It is to be noted that the pulse applied to the cathode 14 has a magnitude sufficiently negative that it overcomes the positive bias voltage applied thereto and drives the cathode 14 negative.

The length of the current pulse generated by pulse-forming network 28 and applied to the cathode 14 of electron gun 10 is determined by the combined length of the coaxial delay lines 30. Accordingly, each of the delay lines 30 are sized in length such that, together with an associated resistor 32, they provide a charging system generating a predetermined pulse length upon discharge. For example, to generate pulse lengths of 1, 3, 10, 30 and 100 nanoseconds, the following size characteristics have been found to be operable when using RG8/U coaxial cable for coaxial lines 30B, C, D and E and air dielectric line for coaxial line 30A.

| | | |
|---|---|---|
| Coaxial delay line 30A | cm | 10 |
| Coaxial delay line 30B | do | 20 |
| Coaxial delay line 30C | do | 69 |
| Coaxial delay line 30D | do | 198 |
| Coaxial delay line 30E | do | 695 |
| Resistor 32A | megohms | 50 |
| Resistor 32B | do | 50 |
| Resistor 32C | do | 20 |
| Resistor 32D | do | 5 |
| Resistor 32E | do | 1.5 |

To effect a pulse length of 1 nanosecond, coaxial switch 36A is actuated so that delay line 30A is connected via resistor 32A to the voltage supply 34. To effect a pulse length of 3 nanoseconds, coaxial switch 36A is left in its normally closed position, interconnecting delay lines 30A and 30B, and coaxial switch 36B is actuated to connect coaxial delay line 30B to the voltage supply 34 via resistor 32B. To effect a pulse length of 10 nanoseconds, coaxial switches 36A and 36B are left in their normally closed positions, thereby interconnecting coaxial delay lines 30A, 30B and 30C, and coaxial switch 36C is actuated to connect coaxial delay line 30C via resistor 32C to the voltage supply 34. To effect a pulse length of 30 nanoseconds, coaxial switches 36A, 36B and 36C are left in their normally closed position, thereby interconnecting coaxial delay lines 30A, 30B, 30C and 30D, and coaxial switch 36D is actuated to connect coaxial delay line 30D via resistor 32D to the voltage supply 34. To effect a 100 nanosecond pulse generation, the coaxial switches 36 are left in their normally closed position as shown in FIG. 1 and delay line 30E is connected to the voltage supply 34 via resistor 32E.

It is desirable that the nanosecond pulse applied to the cathode 14 of electron gun 10 have a rise time and drop-off as short as possible. The shape of the pulse generated by pulse-forming network 28 is determined by the characteristic impedance of the delay lines and hence it is desirable for the practice of the present invention that the characteristic impedance of the delay lines 30 be maintained throughout the apparatus as hereinbefore described. Thus, the delay line 40 has the same characteristic impedance as that of delay line 30 and is terminated in its characteristic impedance at the cathode 14 by parallel connected resistors 42. Further, it is desirable that the mercury-wetted contact switch 38 be coaxial in structure and of the same characteristic impedance as that of the delay lines 30 and 40. The structure of the coaxial mercury-wetted contact switch 38 is shown in FIG. 2. The encapsulated mercury-wetted contacts 48 of the switch 38 are housed with a tubing 80 which is sized with respect thereto to produce the same characteristic impedance as that of the coaxial delay lines 30 and 40. To effect connection with the coaxial delay lines 30 and 40, conventional coaxial connectors 82 and 84 are mounted at the ends of tubing 80 and connected to contacts 48 as shown. The actuating coil 46 of switch 38 is disposed about the tubing 80 as shown.

The rise time or leading edge of the pulse is determined by the operating characteristics of the switch 38. To insure that the rise time is minimal, it is necessary that the contacts of the switch operate with little or no bounce, have a high rise rate of current upon closure and operate with repeatability of pulse shape. It has been found that to obtain these characteristics it is desirable to use a mercury-wetted contact switch.

The control pulse generator 44 of FIG. 1 is illustrated in block form in FIG. 3. A master trigger generator 86 has its output connected to a lamp driver 88 which, in turn, drives a neon lamp 90. The light signal from the neon lamp 90 is transmitted through a Lucite rod 92 to a photomultiplier 94 whose output is used to fire a thyratron pulse generator 96. The output from the thyratron pulse generator is fed to a one-shot multivibrator 98 whose output, in turn, drives the actuating coil 46 of the switch 38.

Figure 5:
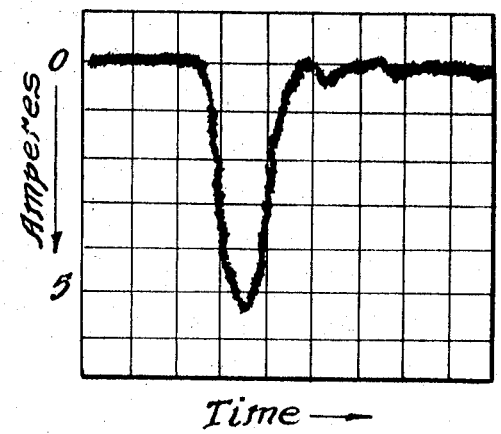
FIG. 5 is a graphical display of a typical beam current pulse obtained using the apparatus of FIG. 2.
Figure 6:
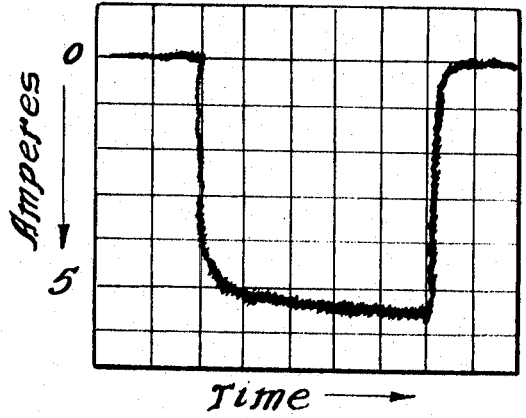
FIG. 6 is a graphical display of a typical beam current pulse obtained using the apparatus of FIG. 2.

In FIGS. 4, 5 and 6, electron beam output pulses are shown for the apparatus of FIG. 1. FIG. 4 illustrates an output electron pulse of 2 amperes having a duration of 1 nanosecond. FIG. 5 illustrates an output pulse of 5 amperes having a duration of 1 nanosecond. FIG. 6 illustrates an output pulse of 5 amperes having a duration of 100 nanoseconds. These output pulses were obtained with the apparatus of FIG. 1 utilizing an electron gun having a conventional cathode and grid assembly of the type ML-7698 manufactured by Machlett Laboratories, Inc. A .8 cm.$^2$ Phormat cathode was the emitter with a capability of producing a peak current density of 20 amperes/cm.$^2$. The grid 16 consisted of a mesh of 25 micron diameter titanium-plated tungsten wire with 55 x 55 wires/cm. Average cold spacing between the cathode 14 and grid 16 was about 100 microns with an effective input capacitance of approximately 8 picofarads. The rated duty cycle was 0.0033. The output pulse from the pulse-forming network 28 had an amplitude of 250 volts and a duration of 2.5 milliseconds. The repetition rate of the switch 38 was varied from a single pulse to a repetition rate range of 1–100 pulses/sec. The pulse applied to the cathode 14 had an amplitude of approximately −300 volts and the cutoff bias on the cathode 14 was approximately +150 volts to give an effective grid voltage (with the grid electrically grounded) of approximately +150 volts. The anode-to-grid field strength was maintained at approximately 15 kv./cm. With a cathode temperature of approximately 850° C. (heater current of 1.5 amperes at a voltage of approximately 7.2 volts), an external 3 mev. pulse of electrons of 2 amperes at 1 nanosecond duration, as shown in FIG. 4, was obtained. With the cathode temperature raised to approximately 1000° C., a 5-ampere pulse beam was obtained with a current density of 30–35 amperes/cm.$^2$ for durations of 1 and 100 nanoseconds, as shown in FIGS. 5 and 6. Interpulse current for the aforedescribed operation was approximately $1 \times 10^{-11}$ amperes with the bias of +150 volts applied to the cathode 14. The rise and fall times on the pulses shown in FIGS. 4, 5 and 6 are approximately 0.3 nanosecond.

Persons skilled in the art will, of course, readily adapt the teachings of the present invention to embodiments far different than the embodiments described and illustrated above. Accordingly, the scope of the present invention should not be limited to the particular embodiment illustrated in the drawings and described above, but should be determined only in accordance with the appended claims.

The embodiments of the invention in which an exclusive property or privilege is claimed are defined as follows:

1. A pulsed electron source comprising:
   (1) an electron gun including an anode, a cathode, and a grid,
   (2) means for electrically biasing the anode and grid of said electron gun,
   (3) a first coaxial delay line,
   (4) a voltage supply,
   (5) means for connecting said voltage supply to said delay line to effect charging thereof, and
   (6) coaxial switching means for transferring the charge on said delay line to the cathode of said electron gun.

2. The apparatus of claim 1 further including and wherein said voltage supply connecting means comprise:
   (1) a plurality of second coaxial delay lines,
   (2) a plurality of resistors, and
   (3) coaxial means for serially connecting a variable number of said second coaxial delay lines and said first coaxial delay line through a preselected one of said resistors to said votlage supply to effect charging of said serially connected first and second coaxial delay lines.

3. The apparatus of claim 1 wherein said switching means comprise:
   (1) a third coaxial delay line,
   (2) means for terminating said third coaxial delay line in its characteristic impedance on said cathode of said electron gun, and
   (3) coaxial switching means including mercury-wetted contact arms and interconnected of said first and third coaxial delay lines to effect transfer therebetween of said charge on said first coaxial delay line.

4. The apparatus of claim 3 wherein said first and third coaxial delay lines and said coaxial switch means have like characteristic impedances.

5. The apparatus of claim 4 further including:
   (1) means for biasing said cathode of said electron gun electrically positive, and wherein
   (2) said grid of said electron gun is electrically grounded,
   (3) said anode of said electron gun is biased electrically positive,
   (4) said first delay is charged to a negative potential sufficient to drive said cathode potentially negative.

6. A pulsed electron source comprising:
   (1) means for producing an electron beam responsive to an applied voltage pulse,
   (2) a first coaxial delay line,
   (3) means for electrically charging said coaxial delay line,
   (4) and coaxial means including a switch having mercury-wetted contacts interconnected of said coaxial delay line and said electron-producing means for transferring the charge on said coaxial delay line to said electron-beam-producing means,
   (5) said coaxial means being terminated at said electron-beam-producing means in its characteristic impedance,
   (6) said coaxial means and said coaxial means and said coaxial delay line having like characteristic impedances.

7. The apparatus of claim 6 wherein:
   (1) said electron-beam-producing means comprise an electron gun including an anode, a cathode, a grid and means for electrically biasing said anode and grid of said electron gun,
   (2) said electrical charging means comprise a voltage source and a resistor interconnecting said coaxial delay line and said voltage source,
   (2) said coaxial means comprise a second coaxial delay line terminated in its characteristic impedance on said cathode of said electron gun, and coaxial switch means including mercury-wetted contact arms, said coaxial switch being interconnected of said first and second coaxial delay lines to effect transfer of said charge on said first coaxial delay line,
   (4) said first and second coaxial delay lines and said coaxial switch have like characteristic impedances.

8. The apparatus of claim 7 further including:
   (1) means for applying a positive electrical potential to said cathode of said electron gun, and wherein
   (2) said anode of said electron gun is biased electrically positive,
   (3) said grid of said electron gun is electrically grounded,
   (4) said coaxial delay line is charged to a potential to drive said cathode of said electron gun electrically negative in potential.

References Cited
UNITED STATES PATENTS

| | | | |
|---|---|---|---|
| 2,545,018 | 3/1951 | Blumlein | 328—67 |
| 2,568,319 | 9/1951 | Christensen | 328—67 X |
| 2,608,654 | 8/1952 | Street | 328—67 |
| 2,837,638 | 6/1958 | Frink | 328—67 |
| 2,947,884 | 8/1960 | Horodyski | 328—67 X |

JAMES W. LAWRENCE, Primary Examiner

C. R. CAMPBELL, Assistant Examiner

U.S. Cl. X.R.

250—98, 49.5, 227; 313—63; 320—1; 328—67, 227; 335—154